No. 673,202. Patented Apr. 30, 1901.
A. R. FOSS & L. W. LITCH.
MOLDING MACHINE FOR FIBROUS LEATHER.
(Application filed Sept. 16, 1899.)
(No Model.)
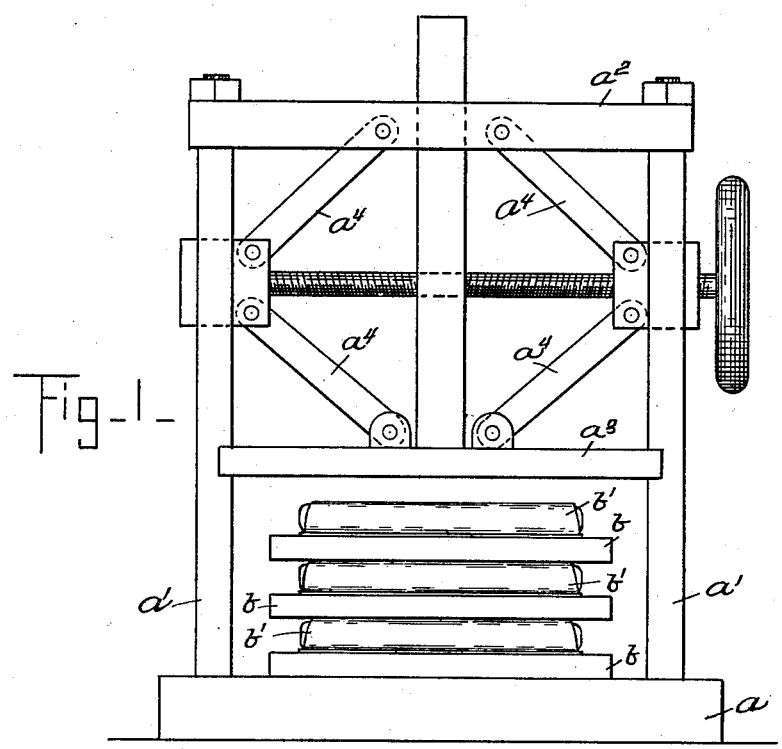
Fig-1-
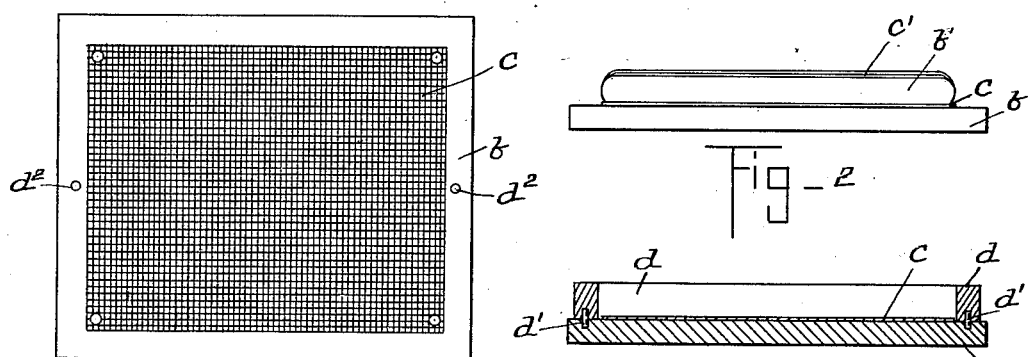
Fig-2-
Fig-3-
Fig-4-
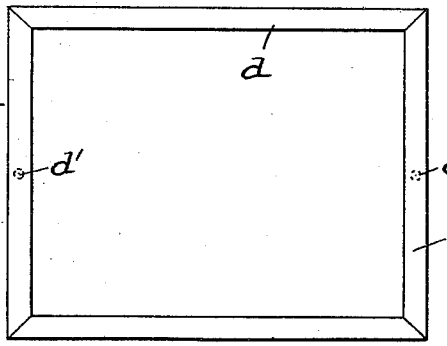
Fig-5-
Witnesses:
H. B. Davis.
J. L. Hutchinson
Inventors
Albert R. Foss.
Lemuel W. Litch.
by B. J. Noyes
atty.
THE NORRIS PETERS CO., PHOTO-LITHO., WASHINGTON, D. C.

UNITED STATES PATENT OFFICE.

ALBERT R. FOSS AND LEMUEL W. LITCH, OF LYNN, MASSACHUSETTS, ASSIGNORS TO THE FOSSLITCH LEATHER CO., OF SAME PLACE.

MOLDING-MACHINE FOR FIBROUS LEATHER.

SPECIFICATION forming part of Letters Patent No. 673,202, dated April 30, 1901.

Application filed September 16, 1899. Serial No. 730,719. (No model.)

*To all whom it may concern:*

Be it known that we, ALBERT R. FOSS and LEMUEL W. LITCH, of Lynn, county of Essex, and State of Massachusetts, have invented an Improvement in Molding-Machines for Fibrous Leather, of which the following description, in connection with the accompanying drawings, is a specification, like letters on the drawings representing like parts.

In the manufacture of artificial leather—such, for instance, as described in our application for Letters Patent, Serial No. 740,533, filed December 16, 1899—fibrous pieces of leather are softened and the same is molded into sheets. The softened fibrous pieces are of different shapes and sizes and promiscuously arranged in a mass, some of the pieces being quite large and other pieces quite small, and much difficulty has been experienced in molding the same to produce sheets having a smooth flat surface of substantially the same size and of a predetermined thickness. If the fibrous pieces are placed in a mold of common construction and a top plate or platen placed thereon, it has been found that when the pressure is applied the pieces have a tendency to move in different directions as the water is squeezed out, and the sheets thus produced have a very uneven surface, being thick and thin in places and not infrequently have holes which extend entirely through the sheets.

The object of this invention is to improve the construction of a mold whereby the molded sheets will have a smooth flat surface and will be of substantially the same size and of a predetermined thickness.

The invention consists in a mold for molding fibrous material comprising a base-plate, an envelop or sack thereon which receives the material, and a removable rim on said base-plate; also, in a mold for molding fibrous material comprising a base-plate, a woven-wire plate thereon, an envelop or sack containing the material which is placed on said woven-wire plate, and a removable rim on said base-plate; also, in a mold for molding fibrous material comprising a base-plate, a removable rim thereon, an envelop or sack containing the material, and a woven-wire plate located above said envelop or sack; also, in a mold for molding fibrous material comprising a base-plate having thereon a removable rim, a woven-wire plate on said base-plate, an envelop or sack containing the material, and a woven-wire plate located above said envelop or sack.

Figure 1 shows in front elevation a molding-machine provided with a mold embodying this invention. Fig. 2 is an edge view of the mold. Fig. 3 is a detail showing the bottom plate of the mold. Fig. 4 is a cross-section of the bottom plate of the mold having thereon a removable rim which serves as a support for the material which is being placed in the mold and also as a guide to determine the quantity of material necessary for a molded sheet of a given thickness, and Fig. 5 is a plan view of said rim removed.

The press herein shown and which may be used to compress the material in the mold is of a well-known type, and comprises, essentially, a base $a$, uprights $a'$, rising therefrom, a cross-head $a^2$, surmounted on said uprights, a platen $a^3$, toggle-levers $a^4$, connected with said platen and with the cross-head, and a screw for operating said toggle-levers $a^4$; yet so far as this invention is concerned any other form or construction of press may be employed.

The base-plate $b$ of the mold is of any suitable shape and size.

An envelop or sack $b'$, which may be made of any suitable textile or equivalent material, is provided for holding the material when the pressure is applied. The envelop or sack is preferably composed of a large piece of cloth of suitable shape and size adapted to be folded in such manner as to inclose the material.

A woven-wire plate $c$ is attached to the base-plate $b$, as represented in Fig. 3.

As the material which is placed in the mold is in the form of a mass, a rim $d$ (see Fig. 5) is provided, which will be removably placed upon the base-plate $d$, as shown in Fig. 4, to form a box-like structure, which assists in holding the material while being placed in the envelop, and said rim $d$ also serves as a guide to determine how much material shall be placed in the envelop to produce a sheet of a given thickness and to determine the shape of the sheet. The rim $d$ is removed from the base-plate $b$ before the mold is placed in the press. The rim $d$ has on its under side guide-pins $d'$, which enter sockets $d^2$, provided in the base-plate $b$, to thereby insure disposing the rim in correct position on said base-plate and to hold said rim against lateral displacement on said base-plate while the material is being placed in the mold. The operator places the rim $d$ on the base-plate $b$, as shown in Fig. 4, and then places the large piece of cloth which is used in forming the envelop upon the box-like structure thus formed, and then places the material upon the cloth in said box-like structure, packing it in until said box-like structure is filled substantially flush with the top of the rim $d$. Then two opposite sides of the cloth are turned over upon the material, then a woven-wire plate $c'$ is placed in position upon the turned-in or folded sides of the envelop, and then the other two sides of the envelop are turned in or folded over upon said woven-wire plate $c'$. The rim $d$ is then removed from the base-plate $b$, and the mold thus assembled and containing the mass of material is then placed in the press. A number of such molds may be placed in the press at a time, being disposed one above the other. As the pressure is applied it has been found in practice that said woven-wire plates $c\ c'$ effectually hold the material against displacement, and the molded sheets produced have a smooth flat surface both above and below.

If but a single woven-wire plate should be employed, of course but one side of the molded sheet would be given a smooth flat surface, and consequently we prefer to employ two woven-wire plates. We do not, however, desire to limit our invention to attaching one of the woven-wire plates to the base-plate or to using said plates in just the manner herein described.

We claim—

1. A mold for molding fibrous material comprising a base-plate, an envelop or sack thereon which receives the material and a removable rim $d$ on said base-plate, substantially as described.

2. A mold for molding fibrous material comprising a base-plate, a woven-wire plate thereon, an envelop or sack containing the material which is placed on said woven-wire plate, and a removable rim $d$ on said base-plate, substantially as described.

3. A mold for molding fibrous material comprising a base-plate, a removable rim $d$ thereon, an envelop or sack containing the material and a woven-wire plate located above said envelop or sack, substantially as described.

4. A mold for molding fibrous material comprising a base-plate having thereon a removable rim $d$, a woven-wire plate on said base-plate, an envelop or sack containing the material, and a woven-wire plate located above said envelop or sack, substantially as described.

In testimony whereof we have signed our names to this specification in the presence of two subscribing witnesses.

ALBERT R. FOSS.
LEMUEL W. LITCH.

Witnesses:
B. J. NOYES,
JENNIE L. HUTCHINSON.